United States Patent
Tu et al.

(10) Patent No.: US 11,341,587 B2
(45) Date of Patent: May 24, 2022

(54) METHOD OF BATTERY CHARGING AND ENERGY STATION

(71) Applicant: KWANG YANG MOTOR CO., LTD., Kaohsiung (TW)

(72) Inventors: Chia-Cheng Tu, Kaoshiung (TW); Chi-Wei Tien, Kaoshiung (TW); Chien-Hung Chen, Kaoshiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 650 days.

(21) Appl. No.: 16/353,827

(22) Filed: Mar. 14, 2019

(65) Prior Publication Data
US 2019/0287190 A1 Sep. 19, 2019

(30) Foreign Application Priority Data
Mar. 19, 2018 (TW) ................. 107109342

(51) Int. Cl.
| | |
|---|---|
| *G06Q 50/06* | (2012.01) |
| *H02J 7/00* | (2006.01) |
| *H04L 29/08* | (2006.01) |
| *G06F 21/31* | (2013.01) |
| *G06Q 30/06* | (2012.01) |
| *H04L 67/10* | (2022.01) |
| *B60L 53/65* | (2019.01) |
| *H02J 13/00* | (2006.01) |
| *B60L 53/68* | (2019.01) |
| *B60L 53/66* | (2019.01) |
| *G06Q 10/06* | (2012.01) |

(52) U.S. Cl.
CPC .............. *G06Q 50/06* (2013.01); *B60L 53/65* (2019.02); *B60L 53/66* (2019.02); *B60L 53/665* (2019.02); *B60L 53/68* (2019.02); *G06F 21/31* (2013.01); *G06Q 10/06* (2013.01); *G06Q 30/0645* (2013.01); *H02J 7/00* (2013.01); *H02J 7/00036* (2020.01); *H02J 13/0075* (2013.01); *H04L 67/10* (2013.01); *H02J 7/0027* (2013.01)

(58) Field of Classification Search
CPC ... G06Q 50/60; G06Q 30/0645; H02J 7/0052; G06F 21/31; H04L 67/10
USPC ........................................................ 320/106
See application file for complete search history.

(56) References Cited

U.S. PATENT DOCUMENTS

| | | | |
|---|---|---|---|
| 11,194,319 B2 * | 12/2021 | Cella | G05B 23/0286 |
| 2019/0279285 A1 * | 9/2019 | Lin | G06Q 30/0645 |
| 2019/0280503 A1 * | 9/2019 | Hsieh | H02J 7/0047 |

* cited by examiner

*Primary Examiner* — Sun J Lin
(74) *Attorney, Agent, or Firm* — Womble Bond Dickinson (US) LLP

(57) ABSTRACT

A method of battery charging is to be implemented by an energy station communicable with a cloud server that stores reference battery identifiers. The method includes: detecting a provided battery identifier of a battery, and transmitting the provided battery identifier to the cloud server so as to enable the cloud server to determine one of the reference battery identifiers that matches the provided battery identifier, and to determine to which one of a first lease code and a second lease codes the one of the reference battery identifiers thus determined corresponds; and being controlled to charge the battery when it is determined that the one of the reference battery identifiers thus determined by the cloud server corresponds to the first lease code.

24 Claims, 7 Drawing Sheets

METHOD OF BATTERY CHARGING AND ENERGY STATION

CROSS-REFERENCE TO RELATED APPLICATION

This application claims priority of Taiwanese Invention Patent Application No. 107109342, filed on Mar. 19, 2018.

FIELD

The disclosure relates to a method of battery charging and an energy station, and more particularly to a method of battery charging and an energy station for removable batteries.

BACKGROUND

Conventionally, information regarding which one of a long-term lease and a short-term lease a battery of an electric carrier device belongs to may be unknown to a user of the electric carrier device (e.g., if the user is not the owner of the electric carrier device) unless the user takes the battery to an energy station or a vendor, where a battery registered with the long-term lease needs to be recharged at the vendor, and a battery registered with the short-term lease needs to be swapped at the energy station. This is inconvenient and adversely influences popularization of electric carrier devices.

SUMMARY

Therefore, an object of the disclosure is to provide a method of battery charging and an energy station that can alleviate at least one of the drawbacks of the prior art.

According to a first aspect of the disclosure, the method of battery charging is to be implemented by an energy station. The energy station is communicable with a cloud server over the Internet. The cloud server stores a plurality of reference battery identifiers each of which corresponds to a battery and corresponds to one of a first lease code and a second lease code. The method includes:

a) detecting a provided battery identifier of a battery of a user end, and transmitting the provided battery identifier to the cloud server so as to enable the cloud server to determine one of the reference battery identifiers that matches the provided battery identifier, and to determine to which one of the first lease code and the second lease code the one of the reference battery identifiers thus determined corresponds; and b) when it is determined that the one of the reference battery identifiers thus determined corresponds to the first lease code, being controlled to charge the battery of the user end.

According to a second aspect of the disclosure, the energy station includes a controller and a plurality of charging ports. The controller is communicable with a cloud server over the Internet. The cloud server stores a plurality of reference battery identifiers each of which corresponds to a battery and corresponds to one of a first lease code and a second lease code. Each of the charging ports is electrically connected to the controller. One of the charging ports that is about to charge a battery of a user end is configured to detect a provided battery identifier of the battery, and to transmit the provided battery identifier to the controller which relays the provided battery identifier to the cloud server so as to enable the cloud server to determine one of the reference battery identifiers that matches the provided battery identifier, and to determine to which one of the first lease code and the second lease code the one of the reference battery identifiers thus determined corresponds. The controller is configured to, when it is determined by the cloud server that the one of the reference battery identifiers thus determined corresponds to the first lease code, control the one of the charging ports to charge the battery of the user end.

According to a third aspect of the disclosure, the energy station includes a controller and a plurality of charging ports. The controller is communicable with a cloud server over the Internet. The cloud server stores a plurality of reference battery identifiers each of which corresponds to a battery and a pick-up password, and corresponds to one of a first lease code and a second lease code. Each of the charging ports is electrically connected to the controller. One of the charging ports is configured to charge a battery of a user end which has a provided battery identifier matching one of the reference battery identifiers that corresponds to the first lease code. The controller is configured to obtain a pick-up password via input from the user end, transmit the pick-up password thus obtained to the cloud server so as to enable the cloud server to determine whether the pick-up password received from the controller matches the pick-up password corresponding to the one of the reference battery identifiers stored in the cloud server, and permit the battery of the user end to be picked up when it is determined by the cloud server that the pick-up password received from the controller matches the pick-up password corresponding to the one of the reference battery identifiers, or when it is determined by the controller that the pick-up password obtained from the user end matches a pick-up password stored in the battery.

According to a fourth aspect of the disclosure, the energy station includes a controller and a plurality of charging ports. The controller is configured to communicate with a cloud server over the Internet. The cloud server stores a plurality of reference battery identifiers each of which corresponds to a battery and a user end identifier, and corresponds to one of a first lease code and a second lease code. Each of the charging ports is electrically connected to the controller. One of the charging ports is configured to charge a battery of a user end which has a provided battery identifier matching one of the reference battery identifiers that corresponds to the first lease code. The controller is configured to scan a user barcode that is displayed by an electronic device of the user end and that represents a user end identifier of the user end so as to obtain the user end identifier of the user end, transmit the user end identifier thus obtained over the Internet to the cloud server so as to enable the cloud server to determine whether the user end identifier received from the controller matches the user end identifier corresponding to the one of the reference battery identifiers stored in the cloud server, and permit the battery of the user end to be picked up when it is determined by the cloud server that the user end identifier received from the controller matches the user end identifier corresponding to the one of the reference battery identifiers.

According to a fifth aspect of the disclosure, the energy station includes a controller and a plurality of charging ports. The controller is configured to communicate with a cloud server over the Internet. The cloud server stores a plurality of reference battery identifiers each of which corresponds to a battery and a user end identifier, and corresponds to one of a first lease code and a second lease code. Each of the charging ports is electrically connected to the controller. One of the charging ports is connected to a battery which has a provided battery identifier matching one of the reference battery identifiers that corresponds to the second lease code. The controller is configured to scan a user barcode that is displayed by an electronic device of the user end and that represents a user end identifier of the user end so as to obtain the user end identifier of the user end, transmit the user end identifier thus obtained over the Internet to the cloud server so as to enable the cloud server to determine whether the user end identifier received from the controller matches the user end identifier corresponding to the one of the reference battery identifiers, and permit the battery provided on the one of the charging ports to be picked up when it is determined by the cloud server that the user end identifier received from the controller matches the user end identifier corresponding to the one of the reference battery identifiers.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
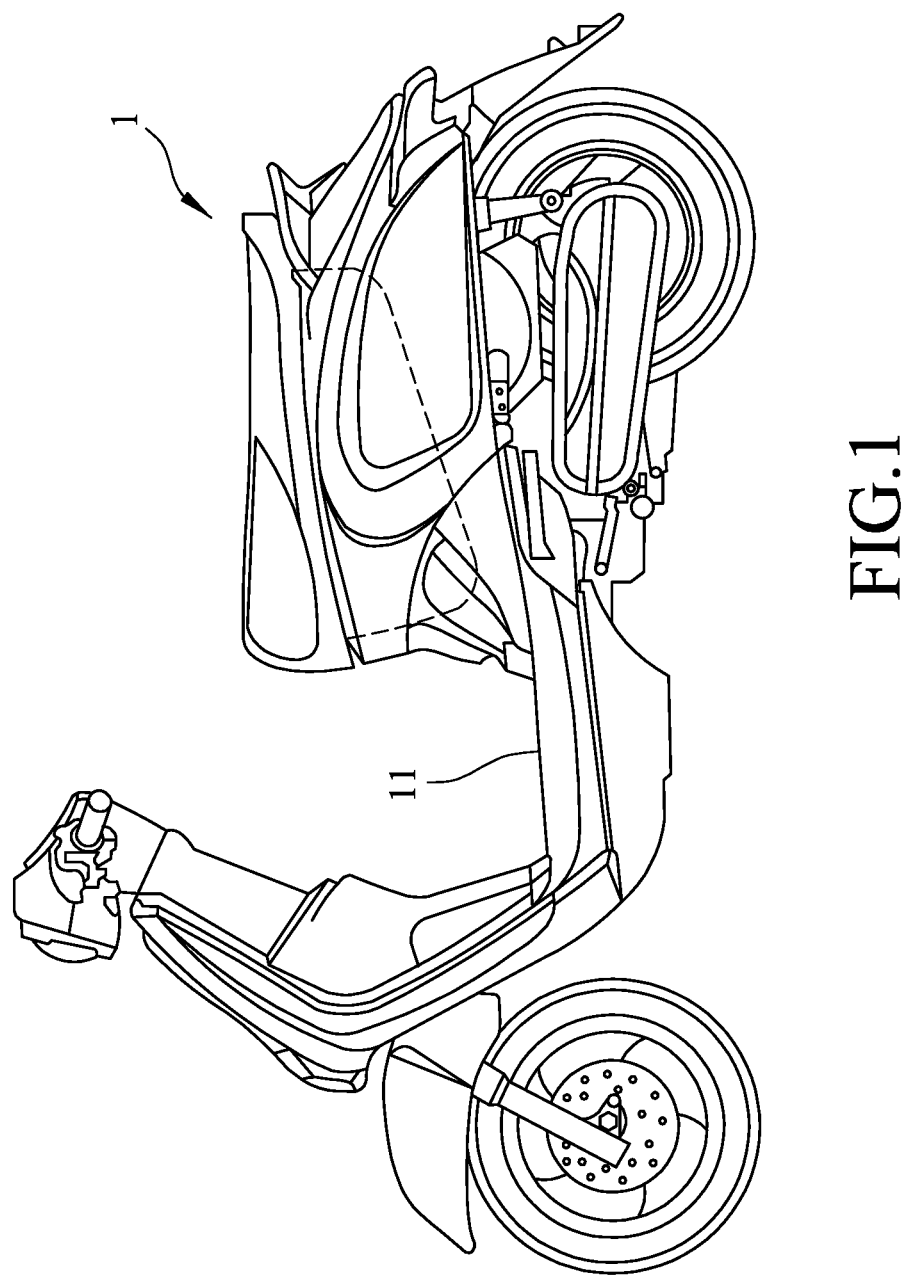
FIG. 1 is a side schematic view illustrating an embodiment of an electric carrier device that includes a battery to be charged by an energy station according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
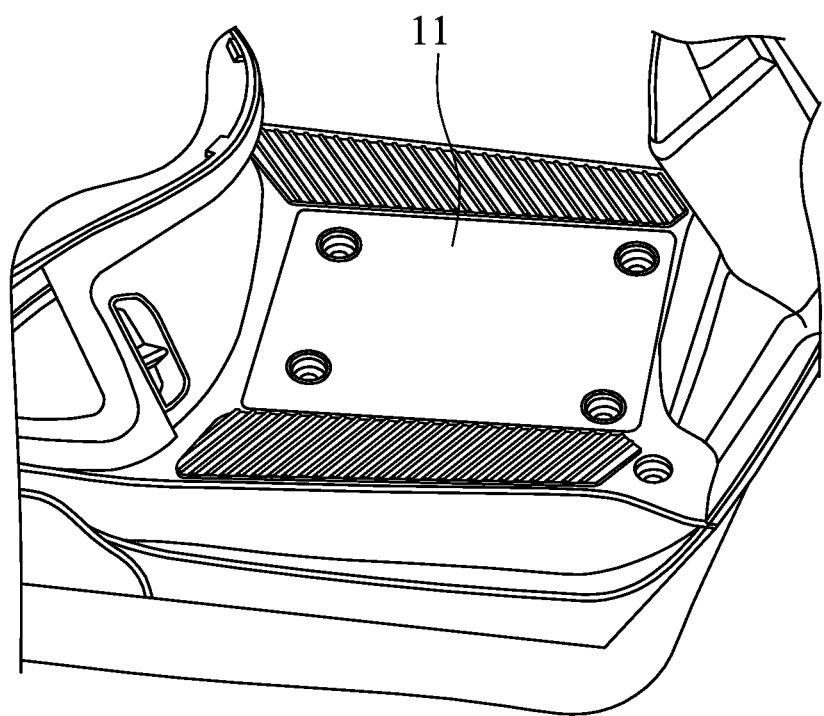
FIG. 2 is a fragmentary perspective schematic view illustrating an embodiment of a footplate of the electric carrier device.
Figure 3:
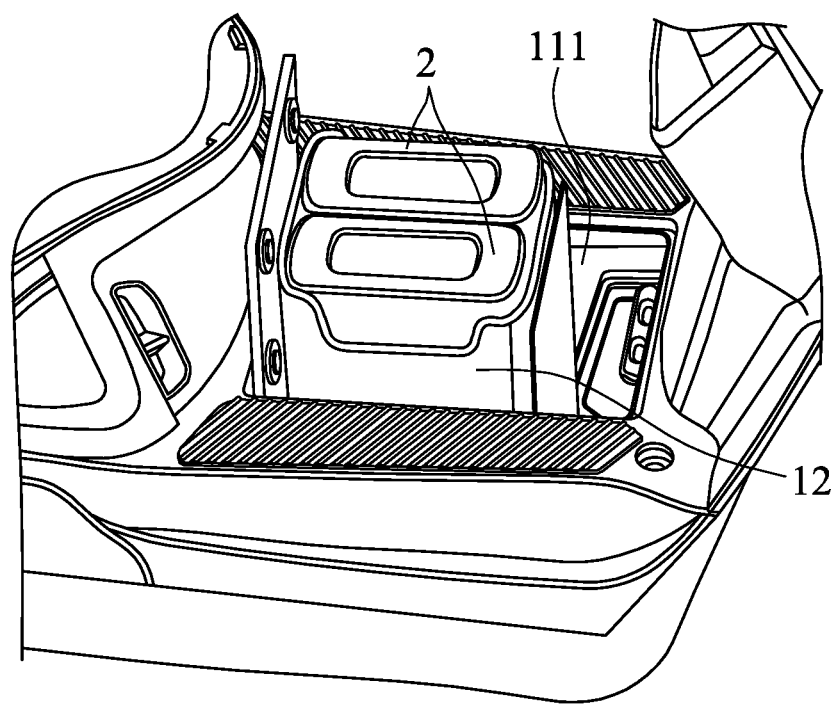
FIG. 3 is a fragmentary perspective schematic view illustrating an embodiment of two removable batteries placed in a battery box under the footplate of the electric carrier device.

Referring to FIGS. 1 to 3, an embodiment of an electric carrier device 1 that includes a battery 2 to be recharged by an energy station according to the disclosure is illustrated. In this embodiment, the electric carrier device 1 is implemented to be an electric motorcycle or an electric scooter, but implementation of the electric carrier device 1 is not limited to the disclosure herein and may vary in other embodiments. The electric carrier device 1 includes a footplate 11 and a battery box 12 disposed in a receiving space 111 under the footplate 11. The battery box 12 is driven to ascend or descend by a motor (not shown) of the electric carrier device 1. The footplate 11 is controlled to be opened when the battery box 12 is driven to ascend, and to be closed when the battery box 12 is driven to descend. In this embodiment, two removable batteries 2 are placed in the battery box 12, but the number and the type of the batteries 2 are not limited to the disclosure herein and may vary in other embodiments. When one of the batteries 2 is running out, a user of the batteries 2 can take the one of the batteries 2 (referred to as the battery 2 hereinafter) out of the battery box 12 for charging the same at the energy station.

Figure 4:
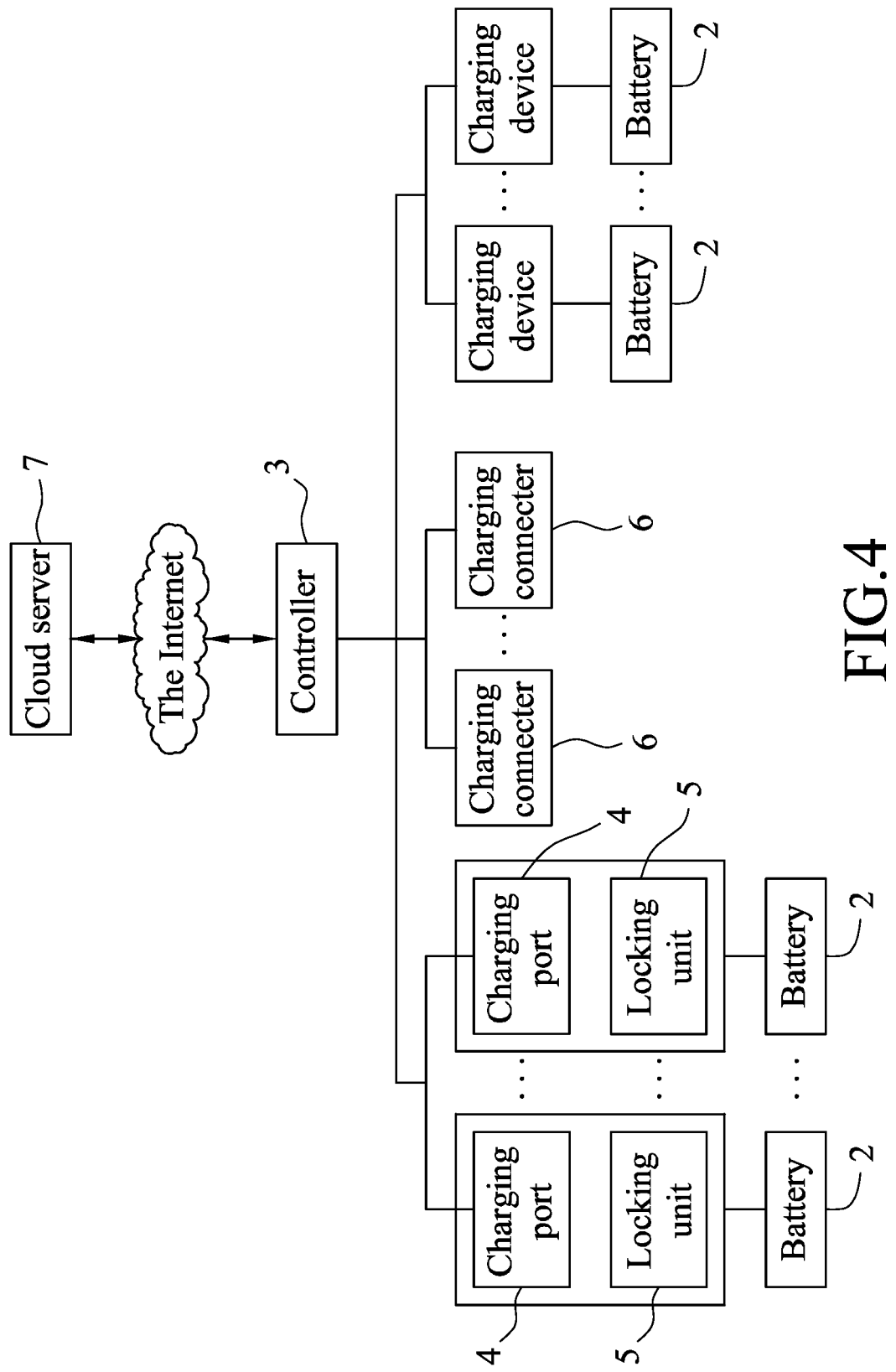
FIG. 4 is a block diagram illustrating an embodiment of the energy station according to the disclosure.

Referring to FIG. 4, an embodiment of the energy station according to the disclosure is illustrated. The energy station includes a controller 3, a plurality of charging ports 4, a plurality of locking units 5 and a plurality of charging connecters 6.

The controller 3 is communicable with a cloud server 7 over the Internet. The cloud server 7 stores a plurality of reference battery identifiers each of which corresponds to a battery and corresponds to one of a first lease code and a second lease code that are different from each other. In this embodiment, the first lease code represents a long-term lease, and the second lease code represents a short-term lease. In addition, each of the reference battery identifiers further corresponds to a pick-up password. The cloud server 7 further stores a plurality of user end identifiers each corresponding to one or more of the reference battery identifiers. Each of the user end identifiers indicates an electronic device. In addition, the energy station includes an energy station identifier that is to be scanned by an electronic device provided with a camera or a scanner.

The controller 3 may be implemented by a personal computer, a workstation, or any electronic device/circuit configurable/programmable in a software manner and/or hardware manner to implement functionalities of this disclosure.

It is worthy to note that since the battery 2 of the electric carrier device 1 is expensive due to cost of production, the user of the electric carrier device 1 usually rents the battery 2 instead of buying one. The types of battery lease for renting a battery include the long-term lease which corresponds to renting of the battery 2 for a long period of time and the short-term lease which corresponds to renting of the battery 2 for a short period of time. To recharge the battery 2, the user who signed the long-term lease may bring the battery 2 to an energy station for battery charging. On the other hand, the user who signed the short-term lease may bring a discharged battery 2 to an energy station set up by an electric carrier device (e.g., vehicle) manufacturer for battery swapping.

Each of the charging ports 4 is electrically connected to the controller 3. One of the charging ports 4 that is about to charge a battery 2 (e.g., when the charging port 4 that is currently not connected to any battery detects presence of a battery 2 nearby as the battery 2 is brought near the charging port 4) is configured to detect a provided battery identifier of the battery 2 of a user end, and to transmit the provided battery identifier to the controller 3 which relays the provided battery identifier to the cloud server 7, so as to enable the cloud server 7 to determine one of the reference battery identifiers that matches the provided battery identifier, and to determine to which one of the first lease code and the second lease code the one of the reference battery identifiers thus determined corresponds.

The provided battery identifier is also known as a battery pack serial number, and is usually recorded on the battery 2 for identification purposes by the vehicle manufacturer during battery development. The provided battery identifier is represented as a two-dimensional (2D) barcode such as a Quick Response (QR) code. The provided battery identifier may be printed as the 2D barcode on apiece of paper pasted on a part of the battery 2 (e.g., a top end of the battery 2) that is easily accessed for being scanned with a scanner of the one of the charging ports 4, or may be stored in an internal storage of the battery 2 for being read via wireless communication between near-field communication (NFC) modules respectively of the battery 2 and the one of the charging ports 4. It is worth to note that after the electric carrier device 1 has started being powered by the battery 2, the internal storage of the battery 2 can be further utilized to record usage-related data of the battery 2 such as power consumption, state of health of the battery, remain capacity, capacity of full charge, voltage of battery, charge/discharge current, cycle count of charge state, charging time, and software/hardware serial numbers of battery.

When purchasing an electric carrier device at a vendor, the user usually logs in to an application program that is launched on the electronic device (e.g., a mobile phone), and registers, at the cloud server 7, user-related data such as the type of battery lease (i.e., the long-term lease or the short-term lease), and the pick-up password for getting the battery 2 back when the battery 2 has been charged up. The cloud server 7 generates a user end identifier that is represented as a QR code based on the user-related data, and transmits the user end identifier to the electronic device of the user. Thereafter, a computer of the vendor obtains the user end identifier by scanning the QR code displayed on the electronic device of the user, obtains the pick-up password corresponding to the user end identifier by communicating with the cloud server 7, and records the pick-up password in the inner storage of the battery 2 based on NFC communication protocols. In this way, the user-related data and what is stored in the internal storage of the battery 2 is bound together.

In one embodiment, the computer of the vendor obtains the provided battery identifier by scanning the QR code on the battery 2 of the user end, binds the provided battery identifier and the user end identifier together, and transmits the provided battery identifier and the user end identifier which have been bound together to the cloud server 7 so as to enable the cloud server 7 to store the provided battery identifier as a reference battery identifier corresponding to the user end identifier of the user purchasing the electric carrier device at the vendor.

When the user has registered at the cloud server 7, and after the provided battery identifier has been transmitted by the vendor to the cloud server 7, the cloud server 7 establishes a correspondence relationship between the provided battery identifier of the battery 2 of the user (serving as one of the reference battery identifiers in the cloud server 7) and the type of battery lease signed by the user.

Specifically speaking, in a first approach, the one of the reference battery identifiers and the first/second lease code are represented as an integrated code. For example, for an integrated code "3510AAGD7981131001", the ninth character "9" from the right side indicates the long-term lease, and for an example of an integrated code "3150AAGD7881131001", the ninth character "8" from the right side indicates the short-term lease. In a second approach, the one of the reference battery identifiers and the first/second lease code are represented as two individual codes. Then, the two individual codes are correlated with each other. The correspondence relationship between the one of the reference battery identifiers and the first or second lease code (i.e., the integrated code or the set of two individual codes) may also be stored in the internal storage of the battery 2.

The locking units 5 respectively correspond to the charging ports 4, and are switchable between one of a locked state for battery charging and an unlocked state for releasing the battery 2 for pick-up. In this embodiment, each of the locking units 5 is implemented to be a mechanical lock that is to be manually switched between the locked state and the unlocked state, but implementation of the locking unit 5 is not limited to the disclosure herein and may vary in other embodiments. For example, in one embodiment, each of the locking units 5 is implemented to be an electronic lock that is to be controlled based on a locking signal that is generated and transmitted by the controller 3 according to a charge signal indicating the result of determination made by the cloud server 7 (determination regarding which one of the reference battery identifiers matches the provided battery identifier, and to which one of the first lease code and the second lease code the one of the reference battery identifiers thus determined corresponds) so as to be switched between the locked state and the unlocked state. In this embodiment, the locking unit 5 that has been switched to the unlocked state for releasing the battery is automatically switched back to the locked state after a predetermined time period has elapsed during which the battery 2 has not been picked up so as to prevent the battery 2 from being stolen.

The controller 3 is configured to, when it is determined by the cloud server 7 that the one of the reference battery identifiers thus determined to match the provided battery identifier of the battery 2 of the user end corresponds to the first lease code, receive the charge signal transmitted by the cloud server 7 and to control the one of the charging ports 4 (that was about to charge the battery 2) to charge the battery 2 of the user end.

In one embodiment, the controller 3 is configured to, when it is determined by the cloud server 7 that the one of the reference battery identifiers thus determined corresponds to the first lease code, receive the pick-up password from the cloud server 7 so as to control the one of the charging ports 4 (that was about to charge the battery 2) to charge the battery 2 of the user end.

Specifically speaking, one of the locking units 5 corresponding to the one of the charging ports 4 that was about to charge the battery 2 is configured to switch to the locked state, under control of the controller 3 based on the charge signal, so as to lock the battery 2 of the user end which has been put into a battery slot of the one of the charging ports 4, and establish an electrical connection between the battery 2 of the user end and the one of the charging ports 4 for charging the battery 2 of the user end.

The controller 3 is configured to, when the one of the charging ports 4 has charged up the battery 2 of the user end, transmit a charge-up signal to the cloud server 7 so as to enable the cloud server 7 to transmit, based on the charge-up signal, a pick-up message to the controller 3 of the energy station and to an electronic device indicated by a user end identifier corresponding to the one of the reference battery identifiers thus determined by the cloud server 7.

Each of the charging connecters 6 is electrically connected to the controller 3 and is configured to charge an electric carrier device.

In one embodiment, the energy station further includes a plurality of charging devices each of which is configured to directly charge the battery 2 as shown in FIG. 4.

Figure 5:
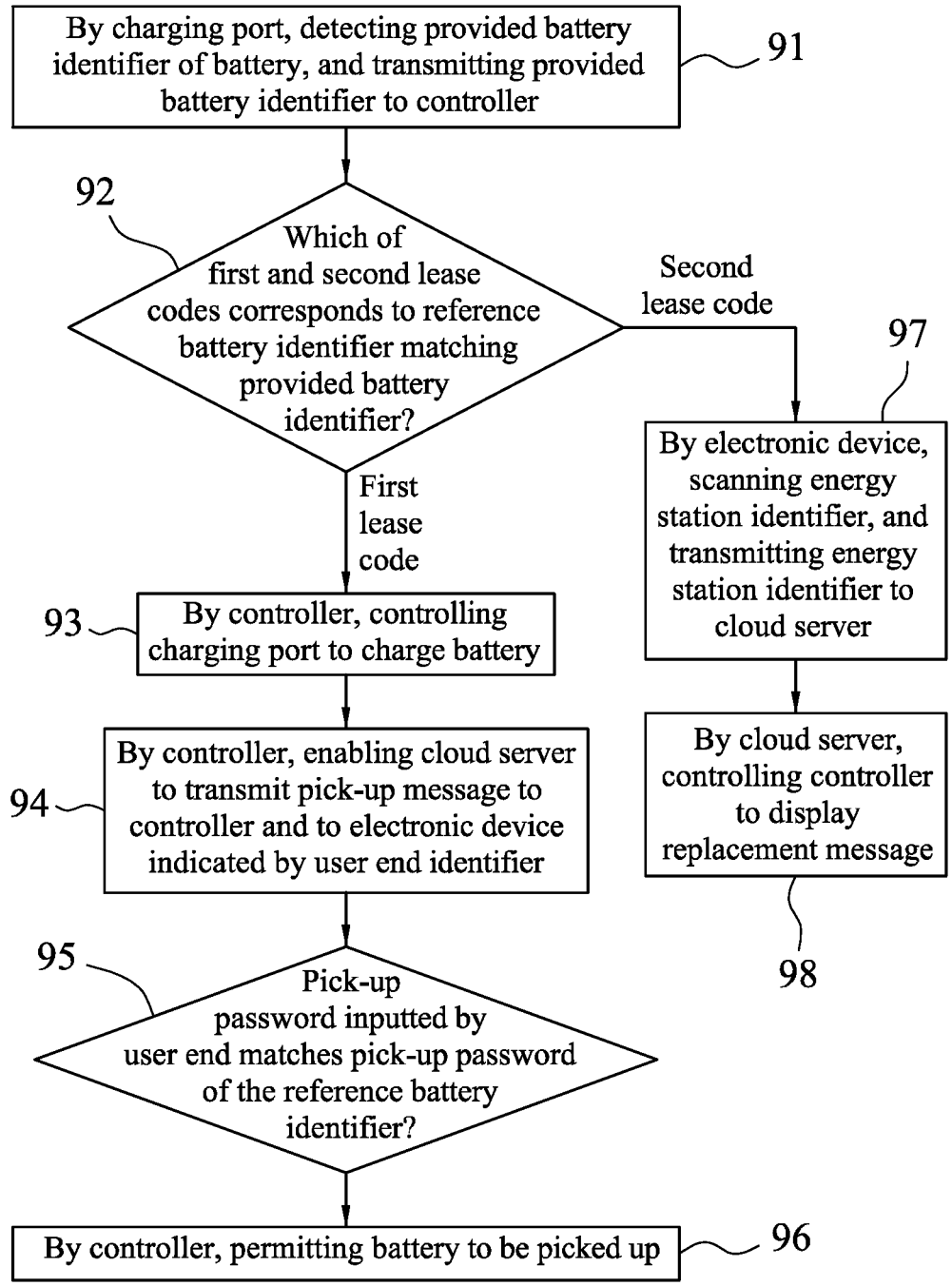
FIG. 5 is a flow chart illustrating an embodiment of a method of battery charging according to the disclosure.

Referring to FIG. 5, an embodiment of a method of battery charging according to the disclosure is illustrated. The method is to be implemented by the energy station that is previously described. The method includes steps 91 to 98 described as follows.

In step 91, one of the charging ports 4, which is about to charge the battery 2 of the user end that is to be recharged or swapped (referred to hereinafter as the corresponding one of the charging ports 4) (for instance, the battery 2 is brought into physical contact with the corresponding one of the charging ports 4 and the locking unit 5 that corresponds to the corresponding one of the charging ports 4 is still in the unlocked state so no electrical connection between the battery 2 and the corresponding one of the charging ports 4 has been established), of the energy station detects the provided battery identifier of the battery 2 of the user end, and transmits the provided battery identifier to the controller 3.

In step 92, the controller 3 of the energy station transmits the provided battery identifier to the cloud server 7 so as to enable the cloud server 7 to determine one of the reference battery identifiers that matches the provided battery identifier, and to determine to which one of the first lease code and the second lease code the one of the reference battery identifiers thus determined corresponds. When it is determined by the cloud server 7 that the one of the reference battery identifiers thus determined corresponds to the first lease code (i.e., the long-term lease), it means that the battery 2 is allowed to be charged by the corresponding one of the charging ports 4, and a flow of procedure of this method proceeds to step 93. On the other hand, when it is determined by the cloud server 7 that the one of the reference battery identifiers thus determined corresponds to the second lease code (i.e., the short-term lease), it means that the battery 2 belongs to the short-term lease and may be swapped for a fully-charged battery, and the flow proceeds to step 97.

Figure 6:
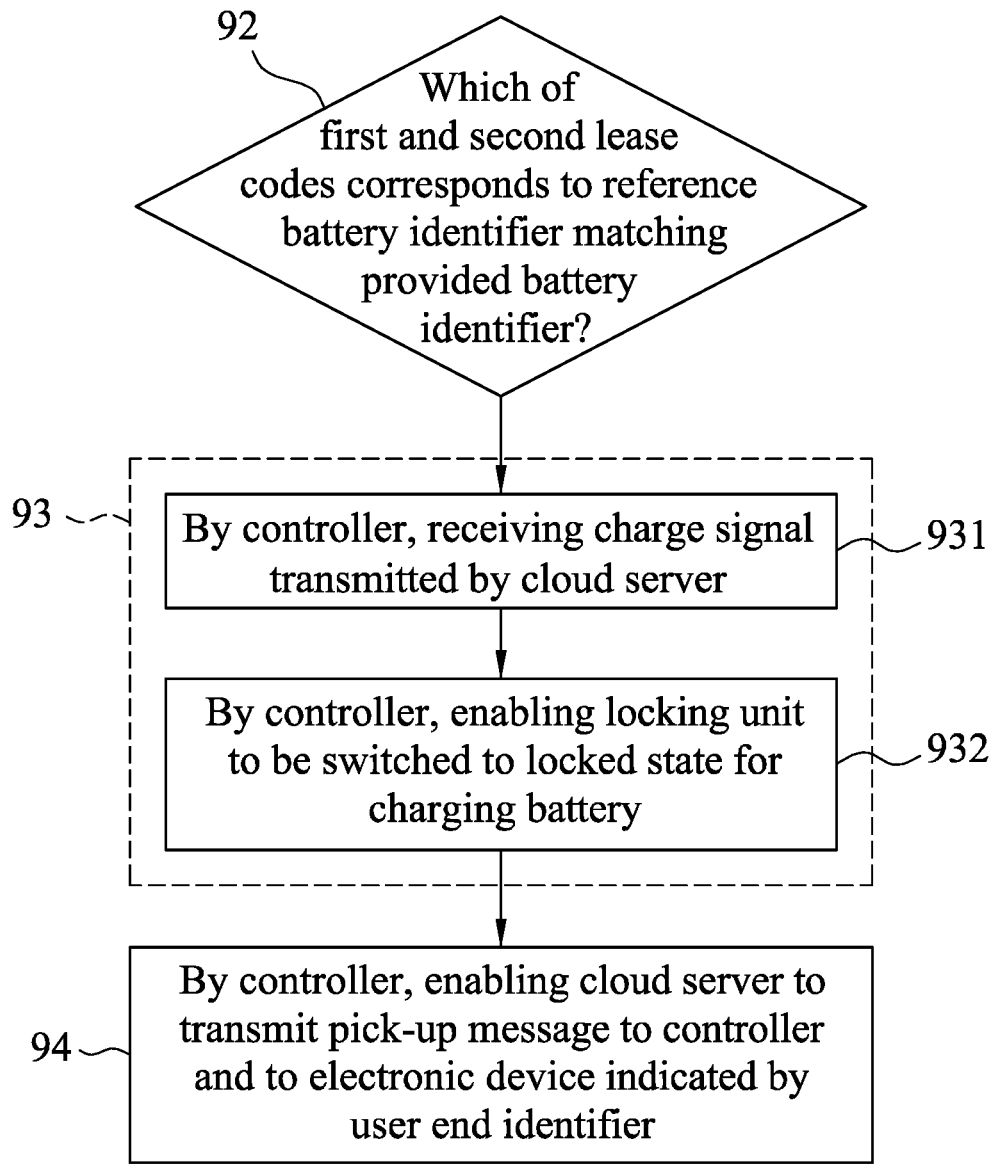
FIG. 6 is a flow chart illustrating an embodiment of control of battery charging of the method according to the disclosure.

In step 93, the energy station is controlled to charge the battery 2 of the user end. Specifically speaking, referring to FIG. 6, step 93 includes sub-steps 931 and 932 described as follows.

In sub-step 931, the controller 3 receives the charge signal transmitted by the cloud server 7 when it is determined by the cloud server 7 that the one of the reference battery identifiers thus determined corresponds to the first lease code. The cloud server 7 further transmits the charge signal to the electronic device indicated by the user end identifier corresponding to the one of the reference battery identifiers thus determined.

In sub-step 932, under control of the controller 3 and based on the charge signal, one of the locking units 5 which corresponds to the corresponding one of the charging ports 4 is enabled to be switched to the locked state so as to lock the battery 2 of the user end to the corresponding one of the charging ports 4 and establish an electrical connection between the battery 2 of the user end and the corresponding one of the charging ports 4 for charging the battery 2 of the user end. The user who possesses the electronic device receiving the charge signal from the cloud server 7 may be prompted to manually operate the one of the locking units 5 to switch to the locked state.

In this embodiment, when the electrical connection for charging the battery 2 is established, an indicating light (not shown) corresponding to the corresponding one of the charging ports 4 which is connected to the battery 2 of the user end will be triggered to emit light. However, implementation of state-of-charge indication is not limited to the disclosure herein and may vary in other embodiments.

In one embodiment, when it is determined by the cloud server 7 that the one of the reference battery identifiers thus determined corresponds to the first lease code, the controller 3 of the energy station receives the pick-up password corresponding to the battery 2 of the user end from the cloud server 7 so as to be controlled to charge the battery 2 of the user end by transmitting the locking signal to switch the one the locking units 5, that is implemented to be the electronic lock, to the locked state. It should be noted that the way that the cloud server 7 controls the energy station to charge the battery 2 is not limited to the disclosure herein and may vary in other embodiments.

Referring back to FIG. 5, in step 94, when the corresponding one of the charging ports 4 has charged up the battery 2 of the user end, the controller 3 of the energy station enables the cloud server 7 to transmit the pick-up message to the controller 3 and to the electronic device (e.g., the mobile device) indicated by one of the user end identifiers corresponding to the one of the reference battery identifiers thus determined.

Figure 7:
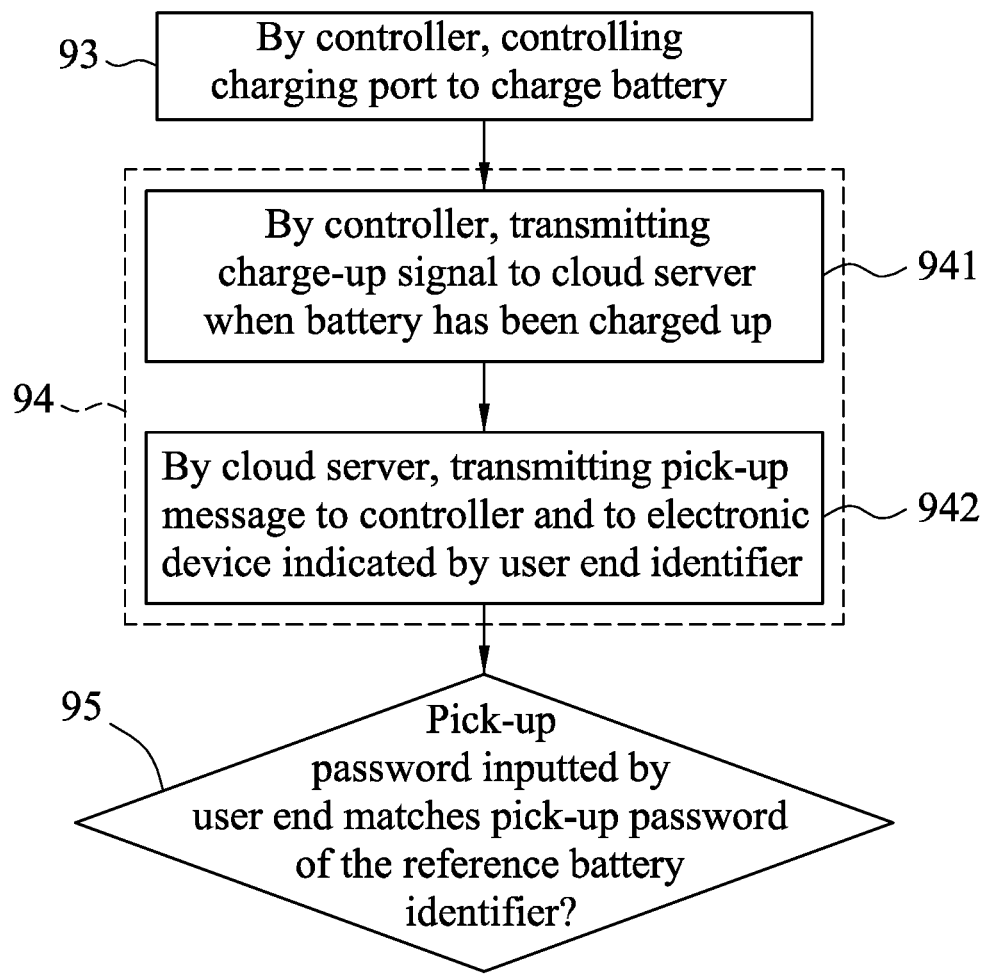
FIG. 7 is a flow chart illustrating an embodiment of transmission of a pick-up message of the method according to the disclosure.

Specifically speaking, referring to FIG. 7, step 94 includes sub-steps 941 and 942 described as follows.

In sub-step 941, when the corresponding one of the charging ports 4 has charged up the battery 2 of the user end, the controller 3 transmits the charge-up signal to the cloud server 7.

In sub-step 942, the cloud server 7 transmits, based on the charge-up signal, the pick-up message to the controller 3 of the energy station and to the electronic device (i.e., the mobile device) indicated by the one of the user end identifiers corresponding to the one of the reference battery identifiers thus determined. Notified by the pick-up message, the user is prompted to input the pick-up password in order to pick up the battery 2 that has been charged up at the energy station.

Referring back to FIG. 5, in step 95, the controller 3 obtains the pick-up password via input from the user end, and transmits the pick-up password thus obtained to the cloud server 7 so as to enable the cloud server 7 to determine whether the pick-up password received from the controller 3 matches the pick-up password corresponding to the one of the reference battery identifiers stored in the cloud server 7. Alternatively, in a variation of this embodiment, the controller 3 is configured to determine whether the pick-up password obtained from the user end matches the pick-up password stored in the battery 2 of the user end.

In step 96, the controller 3 permits the battery 2 of the user end to be picked up when it is determined by the cloud server 7 that the pick-up password received from the controller 3 matches the pick-up password corresponding to the one of the reference battery identifiers, or when it is determined by the controller 3 that the pick-up password obtained from the user end matches the pick-up password stored in the battery 2. Then, the one of the locking units 5 may be operated by the user to switch to the unlocked state so as to release the battery 2 of the user end for pick-up and to cut off the electrical connection between the battery 2 and the corresponding one of the charging ports 4. At this moment, the corresponding indicating light is off. It should be noted that implementation of releasing the battery 2 is not limited to the disclosure herein and may vary in other embodiments.

In step 97, when it is determined by the cloud server 7 in step 92 that the one of the reference battery identifiers thus determined corresponds to the second lease code, the cloud server 7 transmits a prompt message to the electronic device indicated by one of the user end identifiers corresponding to the one of the reference battery identifiers thus determined, so as to prompt the user to operate the electronic device to perform scanning of the energy station identifier (which may be represented as a QR code) of the energy station by the application program that is launched on the electronic device and that is provided by the vehicle manufacturer, and to then transmit the energy station identifier to the cloud server 7.

In step 98, based on the energy station identifier, the cloud server 7 controls the controller 3 of the energy station corresponding to the energy station identifier to display a replacement message. The replace message prompts replacement of the battery 2 of the user end with another fully-charged battery stored in the energy station. The replacement message may be displayed to indicate which one of the charging ports 4 said another fully-charged battery is disposed, and after swapping the two batteries, the one of the charging ports 4 (now coupled to the battery 2 that has run out) is controlled by the controller 3 to charge the battery 2. It is worth to note that, the number of battery a single user is allowed to rent under the short-term lease is not limited to one and may vary depending on demands of the user end.

In one embodiment, the energy station includes a controller 3 configured to communicate with a cloud server 7 over the Internet, and a plurality of charging ports 4 each of which is electrically connected to the controller 3. The cloud server 7 stores a plurality of reference battery identifiers each of which corresponds to a battery and a user end identifier, and corresponds to one of a first lease code and a second lease code. One of the charging ports 4 is configured to charge a battery 2 of a user end which has a provided battery identifier matching one of the reference battery identifiers that corresponds to the first lease code. The controller 3 is configured to scan a user barcode that is displayed by an electronic device of the user end and that represents a user end identifier of the user end so as to obtain the user end identifier of the user end. In this embodiment, the user barcode is a QR code, and is displayed by the electronic device of the user end when an application program is launched on the electronic device and is logged in to. The controller 3 is configured to transmit the user end identifier thus obtained over the Internet to the cloud server 7 so as to enable the cloud server 7 to determine whether the user end identifier received from the controller 3 matches the user end identifier corresponding to the one of the reference battery identifiers stored in the cloud server 7. The one of the reference battery identifiers and the first lease code are represented as one of an integrated code and a set of two individual codes. The controller 3 is further configured to permit the battery 2 of the user end to be picked up when it is determined by the cloud server 7 that the user end identifier received from the controller 3 matches the user end identifier corresponding to the one of the reference battery identifiers.

In a variant of this embodiment, the controller 3 also stores the reference battery identifiers each of which corresponds to a user end identifier. The controller 3 is configured to determine whether the user end identifier obtained by the controller 3 matches the user end identifier corresponding to the one of the reference battery identifiers stored in the controller 3 and matching the provided battery identifier of the battery 2, and to permit the battery 2 of the user end to be picked up when it is determined by the controller 3 that the user end identifier obtained by the controller 3 matches the user end identifier corresponding to the one of the reference battery identifiers.

In one embodiment, the energy station includes a controller 3 configured to communicate with a cloud server 7 over the Internet, and a plurality of charging ports 4 each of which is electrically connected to the controller 3. The cloud server 7 stores a plurality of reference battery identifiers each of which corresponds to a battery and a user end identifier, and corresponds to one of a first lease code and a second lease code. One of the reference battery identifiers corresponding to the second lease code and the second lease code are represented as one of an integrated code and a set of two individual codes. One of the charging ports 4 is connected to a battery which has a provided battery identifier matching one of the reference battery identifiers that corresponds to the second lease code. The controller 3 is configured to scan a user barcode that is displayed by an electronic device of the user end and that represents a user end identifier of the user end so as to obtain the user end identifier of the user end. In this embodiment, the user barcode is a QR code, and is displayed by the electronic device of the user end when an application program is launched on the electronic device and is logged in to. The controller 3 is configured to transmit the user end identifier thus obtained over the Internet to the cloud server 7 so as to enable the cloud server 7 to determine whether the user end identifier received from the controller 3 matches the user end identifier corresponding to the one of the reference battery identifiers. The controller 3 is configured to permit the battery connected to the one of the charging ports 4 to be picked up when it is determined by the cloud server 7 that the user end identifier received from the controller 3 matches the user end identifier corresponding to the one of the reference battery identifiers.

In summary, the method of battery charging according to the disclosure utilizes the energy station to detect the provided battery identifier of the battery 2 of the user end, and to transmit the provided battery identifier to the cloud server 7 so as to enable the cloud server 7 to make a determination about which kind of lease the battery corresponds to. Based on a result of the determination, the energy station is controlled to charge the battery 2 of the user end or to allow battery swapping. Therefore, it is not necessary for the user of the battery 2 to know which kind of lease the battery 2 belongs to, and the energy station will automatically charge the battery 2 or allow battery swapping, which is convenient. In addition, the locking unit 5 corresponding to one of the charging ports 4 about to charge the battery 2 is able to lock the battery 2 to the one of the charging ports 4, and to release the battery 2 after the battery 2 has been charged up and the pick-up password is correctly entered.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

The invention claimed is:

1. A method of battery charging to be implemented by an energy station, the energy station being communicable with a cloud server over the Internet, the cloud server storing a plurality of reference battery identifiers each of which corresponds to a battery and corresponds to one of a first lease code and a second lease code, said method characterized by:
   a) detecting a provided battery identifier of a battery of a user end, and transmitting the provided battery identifier to the cloud server so as to enable the cloud server to determine one of the reference battery identifiers that matches the provided battery identifier, and to determine to which one of the first lease code and the second lease code the one of the reference battery identifiers thus determined corresponds; and
   b) when it is determined by the cloud server that the one of the reference battery identifiers thus determined corresponds to the first lease code, controlling the energy station to charge the battery of the user end.

2. The method as claimed in claim 1, wherein the energy station further includes a plurality of charging ports, and a plurality of locking units that respectively correspond to the charging ports and that are switchable between one of a locked state and an unlocked state, the method characterized in that:
   the step b) includes, by one of the locking units which corresponds to one of the charging ports which is about to charge the battery of the user end, when it is determined that the one of the reference battery identifiers thus determined corresponds to the first lease code, switching to the locked state based on a locking signal generated by the energy station according to a charge signal transmitted by the cloud server so as to lock the battery of the user end to the one of the charging ports and establish an electrical connection between the battery of the user end and the one of the charging ports for charging of the battery of the user end.

3. The method as claimed in claim 2, wherein the energy station further includes a controller which is communicable with the cloud server over the Internet, the cloud server further stores a plurality of user end identifiers each of which corresponds to at least one of the reference battery identifiers, and each of the user end identifiers indicates an electronic device, subsequent to the step b), the method further characterized by:
   c) when the one of the charging ports has charged up the battery of the user end, enabling the cloud server to transmit a pick-up message to the controller and to the electronic device indicated by one of the user end identifiers corresponding to the one of the reference battery identifiers thus determined.

4. The method as claimed in claim 3, wherein the charging ports are electrically connected to the controller, the method characterized in that the step a) includes:
   by one of the charging ports, detecting the provided battery identifier of the battery of the user end, and transmitting the provided battery identifier to the controller; and
   by the controller, transmitting the provided battery identifier to the cloud server so as to enable the cloud server to determine one of the reference battery identifiers that matches the provided battery identifier, and to determine to which one of the first lease code and the second lease code the one of the reference battery identifiers thus determined corresponds.

5. The method as claimed in claim 4, the method characterized in that the step c) includes:
   by the controller when the one of the charging ports has charged up the battery of the user end, transmitting a charge-up signal to the cloud server so as to enable the cloud server to transmit, based on the charge-up signal, the pick-up message to the controller of the energy station and to the electronic device indicated by one of the user end identifiers corresponding to the one of the reference battery identifiers thus determined.

6. The method as claimed in claim 5, characterized in that the step b) includes sub-steps of:
   b-1) by the controller, receiving the charge signal transmitted by the cloud server when it is determined by the cloud server that the one of the reference battery identifiers thus determined corresponds to the first lease code; and
   b-2) by the one of the locking units corresponding to the one of the charging ports which is about to charge the battery of the user end, switching to the locked state according to control of the controller based on the charge signal so as to lock the battery of the user end to the one of the charging ports for charging of the battery of the user end.

7. The method as claimed in claim 1, characterized in that one of the reference battery identifiers corresponding to the first lease code and the first lease code are represented as one of an integrated code and a set of two individual codes.

8. The method as claimed in claim 1, characterized in that the step b) includes:
   receiving a pick-up password from the cloud server so as to be controlled to charge the battery of the user end.

9. An energy station characterized by:
   a controller communicable with a cloud server over the Internet, the cloud server storing a plurality of reference battery identifiers each of which corresponds to a battery and corresponds to one of a first lease code and a second lease code; and
   a plurality of charging ports each of which is electrically connected to said controller, one of said charging ports that is about to charge a battery being configured to detect a provided battery identifier of the battery of a user end, and to transmit the provided battery identifier to the controller which relays the provided battery identifier to the cloud server so as to enable the cloud server to determine one of the reference battery identifiers that matches the provided battery identifier, and to determine to which one of the first lease code and the second lease code the one of the reference battery identifiers thus determined corresponds,
   wherein said controller is configured to, when it is determined that the one of the reference battery identifiers thus determined corresponds to the first lease code, control the one of said charging ports to charge the battery of the user end.

10. The energy station as claimed in claim 9, characterized in that said controller is configured to, when the one of said charging ports has charged up the battery of the user end, transmit a charge-up signal to the cloud server so as to enable the cloud server to transmit, based on the charge-up signal, a pick-up message to said controller and to an electronic device indicated by a user end identifier corresponding to the one of the reference battery identifiers thus determined.

11. The energy station as claimed in claim 10, further characterized by a plurality of locking units which respectively correspond to said charging ports and which are switchable between one of a locked state and an unlocked state;

said controller is configured to, when it is determined by the cloud server that the one of the reference battery identifiers thus determined corresponds to the first lease code, receive a charge signal transmitted by the cloud server; and one of said locking units corresponding to the one of said charging ports is configured to switch to the locked state, according to control of said controller based on a charge signal, so as to lock the battery of the user end to the one of said charging ports and establish an electrical connection between the battery of the user end and the one of said charging ports for charging of the battery of the user end.

12. The energy station as claimed in claim 9, further characterized by a plurality of charging connecters each of which is electrically connected to said controller and is configured to charge an electric carrier device.

13. The energy station as claimed in claim 9, characterized in that one of the reference battery identifiers corresponding to the first lease code and the first lease code are represented as one of an integrated code and a set of two individual codes.

14. The energy station as claimed in claim 9, characterized in that said controller is configured to receive a pick-up password from the cloud server so as to be controlled to charge the battery of the user end.

15. The energy station as claimed in claim 9, characterized in that:

each of the reference battery identifiers further corresponds to a user end identifier; and said energy station includes an energy station identifier that is to be scanned by an electronic device which is indicated by one of the user end identifiers corresponding to the one of the reference battery identifiers thus determined and which is operated to perform the scanning when it is determined by the cloud server that the one of the reference battery identifiers thus determined corresponds to the second lease code, the electronic device transmitting the energy station identifier to the cloud server, said controller being configured to be controlled, by the cloud server based on the energy station identifier, to display a replacement message which prompts replacement of the battery of the user end with another battery stored in said energy station.

16. An energy station characterized by:

a controller communicable with a cloud server over the Internet, the cloud server storing a plurality of reference battery identifiers each of which corresponds to a battery and a pick-up password, and corresponds to one of a first lease code and a second lease code; and a plurality of charging ports each of which is electrically connected to said controller, one of said charging ports being configured to charge a battery of a user end which has a provided battery identifier matching one of the reference battery identifiers that corresponds to the first lease code;

wherein said controller is configured to obtain a pick-up password via an input from the user end, transmit the pick-up password thus obtained to the cloud server so as to enable the cloud server to determine whether the pick-up password received from said controller matches the pick-up password corresponding to said one of the reference battery identifiers stored in the cloud server, and permit the battery of the user end to be picked up when it is determined by the cloud server that the pick-up password received from said controller matches the pick-up password corresponding to said one of the reference battery identifiers, or when it is determined by said controller that the pick-up password obtained from the user end matches a pick-up password stored in the battery.

17. The energy station as claimed in claim 16, characterized in that one of the reference battery identifiers corresponding to the first lease code and the first lease code are represented as one of an integrated code and two individual codes.

18. An energy station comprising:

a controller configured to communicate with a cloud server over the Internet, the cloud server storing a plurality of reference battery identifiers each of which corresponds to a battery and a user end identifier, and corresponds to one of a first lease code and a second lease code; and a plurality of charging ports each of which is electrically connected to said controller, one of said charging ports being configured to charge a battery of a user end which has a provided battery identifier matching one of the reference battery identifiers that corresponds to the first lease code, wherein said controller is configured to scan a user barcode that is displayed by an electronic device of the user end and that represents a user end identifier of the user end so as to obtain the user end identifier of the user end, transmit the user end identifier thus obtained over the Internet to the cloud server so as to enable the cloud server to determine whether the user end identifier received from said controller matches the user end identifier corresponding to said one of the reference battery identifiers stored in the cloud server, and permit the battery of the user end to be picked up when it is determined by the cloud server that the user end identifier received from said controller matches the user end identifier corresponding to said one of the reference battery identifiers.

19. The energy station as claimed in claim 18, characterized in that said controller is configured to scan the user barcode that is a Quick Response (QR) code, and that is displayed by the electronic device of the user end when an application program is launched on the electronic device and is logged in to.

20. The energy station as claimed in claim 18, characterized in that the one of the reference battery identifiers corresponding to the first lease code and the first lease code are represented as one of an integrated code and a set of two individual codes.

21. The energy station as claimed in claim 18, wherein said controller is further configured to store the reference battery identifiers each of which corresponds to a user end identifier, determine whether the user end identifier obtained by said controller matches the user end identifier corresponding to said one of the reference battery identifiers stored in said controller, and permit the battery of the user end to be picked up when it is determined by said controller that the user end identifier obtained by said controller matches the user end identifier corresponding to said one of the reference battery identifiers.

22. An energy station comprising:

a controller configured to communicate with a cloud server over the Internet, the cloud server storing a plurality of reference battery identifiers each of which corresponds to a battery and a user end identifier, and corresponds to one of a first lease code and a second lease code; and a plurality of charging ports, each of which is electrically connected to said controller, one of said charging ports being connected to a battery which has a provided battery identifier matching one of the reference battery identifiers that corresponds to the second lease code, wherein said controller is configured to scan a user barcode that is displayed by an electronic device of the user end and that represents a user end identifier of the user end so as to obtain the user end identifier of the user end, transmit the user end identifier thus obtained over the Internet to the cloud server so as to enable the cloud server to determine whether the user end identifier received from said controller matches the user end identifier corresponding to said one of the reference battery identifiers, and permit the battery connected to the one of said charging ports to be picked up when it is determined by the cloud server that the user end identifier received from said controller matches the user end identifier corresponding to said one of the reference battery identifiers.

23. The energy station as claimed in claim 22, characterized in that said controller is configured to scan the user barcode that is a Quick Response (QR) code, and that is displayed by the electronic device of the user end when an application program is launched on the electronic device and is logged in to.

24. The energy station as claimed in claim 22, characterized in that one of the reference battery identifiers corresponding to the second lease code and the second lease code are represented as one of an integrated code and a set of two individual codes.

* * * * *